May 28, 1968  P. R. HONAN ET AL  3,385,448

UP-FLOW SELF-CLEANING FILTER APPARATUS

Filed Dec. 19, 1966

INVENTORS.
PAUL R. HONAN and
AVERY S. HARLAN

BY
Woodard, Weikart, Emhardt & Naughton
Attorneys

United States Patent Office 3,385,448
Patented May 28, 1968

3,385,448
UP-FLOW SELF-CLEANING FILTER APPARATUS
Paul R. Honan, Lebanon, and Avery S. Harlan, Indianapolis, Ind., assignors to Monlan Corporation, Lebanon, Ind., a corporation of Indiana
Filed Dec. 19, 1966, Ser. No. 602,692
1 Claim. (Cl. 210—407)

ABSTRACT OF THE DISCLOSURE

A filtering apparatus having a filtered liquid receptacle nested within a raw liquid tank with the bottom of the filtered liquid receptacle formed of a filter media, the receptacle being mounted so that it is periodically agitated vertically to shake off filtered material collecting on the filter media, the material shaken off settling in the raw liquid tank.

---

This invention relates generally to apparatus for industrial filtering and in particular to an apparatus for continuously filtering liquids such as the cutting, cooling or lubricating liquids used in the operation of power tools.

Apparatus of the type referred to conventionally includes an incoming liquid tank, some means for removing solids which settle out of the incoming liquid, and a filter passage for the liquid to a filtered or output liquid reservoir. The filters can be formed of any well-known filtering medium, and, customarily, are removable for replacement when clogged. U.S. Patent 2,940,595 discloses filtering apparatus having features generally as outlined above.

The apparatus of the present invention represents an improvement over the prior art devices in that it utilizes an upward flow of the raw fluid through a horizontally disposed filter element and provides for agitation or vertical shaking of the filter element, either periodically or under the control of a liquid level responsive member, so that solids filtered from the liquid and adhering to the underface of the filter element will be broken loose and can then settle, by gravity to the base of the tank. This intermittent agitation of the filter element permits the renewal or restoration of the filter element without necessitating its removal or backwashing and, most importantly, without requiring the shut-down of fluid flow and the equipment served by the filtering apparatus.

The primary object of the present invention is, therefore, to provide a liquid filtering apparatus of the type referred to in which the filtering media can be intermittently cleaned or renewed without shutting down the filtering apparatus or otherwise taking it out of service.

A further object of the present invention is to provide a liquid filtering apparatus which utilizes a vertical agitating or oscillating motion of the filter element to dislodge accumulated solids therefrom, the motion of the filter element occurring intermittently during filter operation.

These and other objects will become apparent as the description proceeds with reference to the accompanying drawings in which.

Figure 1:
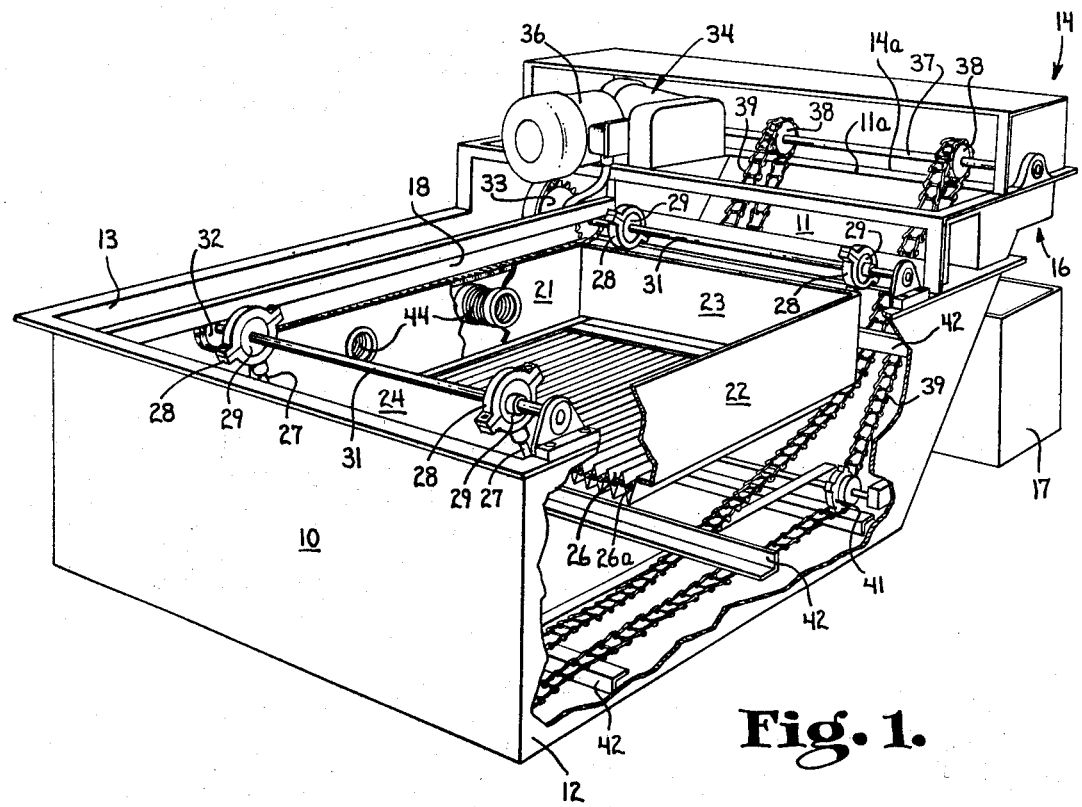
FIG. 1 is a perspective view, with portions broken away, of a liquid filtering apparatus embodying the present invention.

Referring initially to FIG. 1, the liquid filtering apparatus includes an outer housing or tank having an end wall 10, an opposite, inclined end wall 11 and sidewalls 12 and 13. At the upper end of the inclined end wall 11 there is a generally rectangular cap 14, the upper margin 11a of the end wall 11 being spaced from the adjacent margin of the cap 14a so as to provide an open transverse slot or opening in the area indicated generally at 16. Solidified material, removed from the bottom of the tank by apparatus to be subsequently described falls through this opening 16 into a sludge receptacle indicated at 17.

A filter tank, acting as a reservoir of unfiltered liquid, is formed by the sidewall 18, placed parallel to and spaced from the sidewall 13, the wall 18 cooperating with the adjacent portions of the end walls 10 and 11 and the opposite sidewall 12 to form the sides of the filter tank. The spaced sidewalls 13 and 18 and the adjacent portions of the ends walls 10 and 11 form a clean liquid compartment or tank which extends the length of the outer housing and on the left-hand side thereof as viewed in FIG. 1. The reservoir of unfiltered liquid may be supplied by the return line from the machine or tool utilizing the liquid as a cutting or cooling medium.

Nested within, but spaced somewhat from the sidewalls 10, 18, 11 and 12 of the filter tank is a filtered liquid receptacle or tray having sidewalls 21 and 22 and end walls 23 and 24. The receptacle is generally rectangular in configuration and the base of the receptacle is formed by a filter element 26, here shown to be of the pleated type having elongated members 26a for preventing collapse of the pleats as the receptacle is moved within the tank. The receptacle-filter element junction is sealed to prevent by-pass flow of unfiltered liquid.

The filtered liquid receptacle is supported or suspended within the filter tank by means of link elements or arms 27 which, at their lower ends are pivotally connected to the adjacent sidewalls 24 and 23 of the receptacle. At their upper ends of the link elements 27 are attached to rings 28 which encircle eccentrically mounted members 29 which are rotated by the shafts 31. As will be apparent in FIG. 1, the shafts 31 are supported on the opposite margins of the filter tank sidewalls 18 and 12 and are rotationally linked together by means of sprockets and engaging chain 32. The shaft 31 adjacent the inclined end wall 11 extends through the sidewall 18 and carries a sprocket 33 which, by means of a chain, is driven by the output of the speed reducer mechanism indicated generally at 34, the drive for the mechanism 34 being provided by the motor 36. A timer switch may be mounted in the housing for the speed reducer 34, or in any other suitable location, for the purpose of intermittently energizing the motor 36. Other means, such as a float switch, with the float responsive to the liquid level in the tank may also be used for energizing the motor 36 as it is needed.

A shaft 37 is mounted in the cap portion 14 and is rotated by the motor 36 through the speed reducing mechanism 34. The shaft 37 carries sprockets 38 and these serve to move the endless chains 39. The chains 39 are accommodated by idler sprockets 41 in the lower portion of the unfiltered liquid tank and the chains carry conveyor elements 42, which may take the form of angle irons as shown in FIG. 1. The function of the conveyor elements 42 and the chains 39 is to sweep across the bottom of the unfiltered liquid tank, the conveyor elements moving from front to rear as viewed in FIG. 1, to remove solids which have settled to the base of the tank and deliver them to the opening 16. The conveyor mechanism may be extended to the clean tank and utilized to remove overflowed or migrated solids from that compartment also. Solids moving through the opening 16 may be caught in the receptacle 17. The arrangement for removing solids from the base of the unfiltered tank and delivering them to an exterior receptacle forms, in itself, no part of the present invention.

Filtered liquid in the receptacle above the filter media 26 flows from the receptacle into the clean liquid tank which occupies the space between the walls 18 and 13 along the side of the apparatus. The conduits for transferring filtered liquid into the clean liquid tank (from which it may be pumped by suitable mechanism, not shown, to the point of use) may take the form of flexible hoses 44 which communicate with the interior of the receptacle and extend to the exterior of the unfiltered liquid tank, that is, into communication with the clean liquid tank. The flexibility of the elements 44 permits motion of the receptacle within the unfiltered liquid tank as will be subsequently described.

In operation, with fluid flowing from the equipment being serviced by the filtering apparatus into the unfiltered liquid tank, the unfiltered fluid level will rise within the tank and fluid will move upwardly through the filter media 26 into the filtered liquid receptacle. Fluid flows from this receptacle into the clean liquid tank through the flexible hoses 44. As solids accumulate on the underface of the filter 26, some will fall to the base of the unfiltered liquid tank to be removed by the conveyors 41. However, periodically the shafts 31 will be rotated and, by means of the eccentric elements 29, the links 27 will oscillate the filtered liquid receptacle including the filter 26, in a generally vertical direction, this rotation of the shafts 31 taking place periodically as determined by a timer switch or a float switch as previously mentioned. The agitation or oscillation of the filter in a generally vertical direction causes clean liquid in the filtered liquid receptacle or tray to wash downwardly through the filter media on the upstroke of the oscillation thereby forcing solids from the filter. As the solids are loosened from the underface of the filter during the oscillation of the filtered liquid receptacle, the particles dislodged fall to the bottom of the unfiltered liquid tank to be picked up by the conveyor elements. Periodic agitation of the filtered liquid receptacle or tray and of the filter media, which forms a wall of the tray, serves to clean or renew the filter periodically without the necessity of taking the filtering apparatus out of operation.

Figure 2:
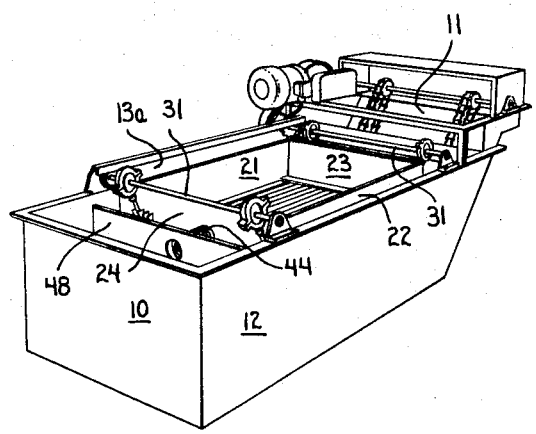
FIG. 2 is a view similar to FIG. 1 but illustrating a modified form of the apparatus of the present invention.

Referring now to FIG. 2, there is shown a modified form of the structure of the present invention, the modification being the placement of the clean liquid tank at the end of the apparatus rather than at the side as is the case in the structure of FIG. 1. Parts which are identical to parts in FIG. 1 are given the same reference numerals in FIG. 2 as those identifying them in FIG. 1. In the structure of FIG. 2 the sides of the unfiltered liquid tank are the walls 12 and 13a, the wall 13a carrying the mounting bearings for one end of the shafts 31. One end of the unfiltered liquid tank is formed by the inclined wall 11 and the other by the end wall 48. The clean liquid tank occupies the space between the end walls 48 and 10. The flexible conduits 44 extend between the interior of the filtered liquid tray to the exterior of the unfiltered liquid tank and empty into the clean liquid tank between the end walls 10 and 48. Operation of the structure of FIG. 2 is, of course, identical to that of FIG. 1 previously described.

It should be noted that in both the structures of FIG. 1 and FIG. 2 there is no possibility of cutting off the supply of liquid to the filtered liquid tank should the motor or the controls actuating the washing or renewing action fail to function. Should such failure occur and consequently flow through the filter be eventually substantially reduced, the liquid level in the unfiltered liquid tank will rise to the point where it overflows the sidewall between the unfiltered liquid tank and the filtered liquid tank so as to bypass unfiltered liquid into the filtered liquid section.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claim.

The invention claimed is:

1. A liquid filtering apparatus including a filter tank providing a reservoir of unfiltered liquid, a filtered liquid receptacle nested within but spaced from the sides of said filter tank, means for removing filtered liquid from the interior of said filtered liquid receptacle, a filter element forming a portion of the receptacle wall and disposed below the normal level of the unfiltered liquid in said filter tank so that liquid moves through the filter into said filtered liquid receptacle with filtered solids retained at the outer face of said filter element, and means for supporting and intermittently agitating said filtered liquid receptacle within said filter tank for removing filtered solids from the outer face of said filter element and causing them to settle into said filter tank, said supporting and agitating means including a pair of shafts mounted for rotation on said filter tank and each shaft extending adjacent to one of a pair of opposite sidewalls of said filtered liquid receptacle, link elements carried at one end by each of said shafts and pivotally connected at the other end to the corresponding one of said sidewalls of the filtered liquid receptacle, and eccentric means connected to each of said shafts and cooperating with said link elements for imparting motion to said receptacle in a plane normal to the rotational axes of said shafts as said shafts are rotated.

References Cited

UNITED STATES PATENTS

| | | | |
|---|---|---|---|
| 1,881,712 | 10/1932 | Laughlin | 210—311 X |
| 2,708,032 | 5/1955 | Heyman | 209—17 |

FOREIGN PATENTS

| | | |
|---|---|---|
| 253,139 | 8/1927 | Great Britain. |

REUBEN FRIEDMAN, *Primary Examiner.*

SAMIH N. ZAHARNA, J. DE CESARE, *Examiners.*